United States Patent
Parry et al.

(10) Patent No.: US 6,275,328 B1
(45) Date of Patent: Aug. 14, 2001

(54) AMPLIFIER CONTROL

(75) Inventors: Simon Parry; Alan Robinson, both of Harlow; Jonathan King, Epping, all of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/361,950

(22) Filed: Jul. 27, 1999

(51) Int. Cl.$^7$ ....................................................... H01S 3/06
(52) U.S. Cl. ............................ 359/337; 359/341; 372/20
(58) Field of Search ................................... 359/337, 341; 372/20

(56) References Cited

U.S. PATENT DOCUMENTS

| | | | |
|---|---|---|---|
| 5,351,317 | * 9/1994 | Weber | 385/3 |
| 5,436,760 | * 7/1995 | Nakabayashi | 359/341 |
| 5,572,351 | * 11/1996 | Hadjifotiou | 359/161 |
| 5,619,004 | * 4/1997 | Dame | 811/616 |
| 6,028,697 | * 2/2000 | Lee | 359/341 |
| 6,091,744 | * 7/2000 | Sorin et al. | 372/20 |

FOREIGN PATENT DOCUMENTS

| | | | |
|---|---|---|---|
| 0794599 A2 | 3/1997 | (EP) . | |
| 0 794 599 A2 | * 10/1997 | (EP) | H01S/3/06 |

OTHER PUBLICATIONS

Khaleghi F et al: "Tunable Coherent Optical Transversal Edfa Gain Equalization" Journal of Lightwave Technology, US, IEEE. New York, vol. 13, No. 4, Apr. 1, 1995, pp. 581–587, XP000513573.

Kyo Inoue et al: "Tumble Gain Equalization Using A Mach–Zender Optical Filter in Multistage Fiber Amplifiers" IEEE Photonics Technology Letters, US, IEEE Inc. New York, vol. 3, No. 8, Aug. 1, 1991, pp. 718–720, XP000223738.

Kyo Inoue, Toshimi Kominato, Hiromu Toba—Tunable Gain Equalization using a Mach–Zehnder Optical Filter in Multistage Fiber Amplifiers IEE Photonics Technology Letters, vol. 3 No. 8, Aug. 1991.

* cited by examiner

Primary Examiner—Thomas H. Tarcza
Assistant Examiner—Deandra M. Hughes
(74) Attorney, Agent, or Firm—Lee, Mann, Smith, McWilliams, Sweeney & Ohlson

(57) ABSTRACT

A method and apparatus for determining control signals of a filter for optimization of the gain profile of an amplifier, particularly though not exclusively for use in optical communications systems, and a system incorporating the same. The method is for calculating at least one control signal for at least one periodic filter arranged to alter the output gain profile of an amplifier, in which at least one of the phase and amplitude of the filter response are tuneable. The method includes the steps of: determining an error profile from the amplifier output gain profile and a predetermined target output gain profile; determining the dot product of the error profile and a first function of similar period and form to the response of the filter; determining the dot product of the error profile and a second function of similar period and form to the response of the filter, said second function being substantially orthogonal to said first; and determining at least one control signal for tuning of said filter from the calculated dot products.

19 Claims, 6 Drawing Sheets

AMPLIFIER CONTROL

FIELD OF THE INVENTION

The present invention relates to a method and apparatus for determining control signals of a filter for optimisation of the gain profile of an amplifier, particularly though not exclusively for use in optical communications systems, and a system incorporating the same.

BACKGROUND TO THE INVENTION

The control of optical power levels in optical communications systems is critical in obtaining optimum performance. The power level needs to be sufficient to establish a signal to noise ratio which will provide an acceptable bit error rate but without the power level exceeding a level at which limiting factors (e.g. the onset of non-linear effects) result in degradation of the signal. In wavelength division multiplexed (WDM) transmission, it is desirable to maintain each of the power levels of the individual wavelength components at substantially the same level.

FIG. 1 illustrates a typical WDM transmission system, in which optical signals are transmitted from the multiplexer 10 to the demultiplexer 12 via optical fibre 14. The individual wavelength components for each channel are generated by the transmitters 16 (Tx) and sent to the receivers 18 (Rx). In order to ensure that optical power is maintained within each of the transmitted channels, one or more line amplifiers 20 are located along the optical fibre transmission path to compensate for power losses in the transmission system.

A typical line amplifier 20 comprises two EDFA (Erbium Doped Filter Amplifier) amplifying elements 22, 22' separated by one or more filters 24.

The gain of the EDFA (and hence the output 28 from line amplifier) depends upon both the optical power in the transmitted input signal 26 and the optical power from the pump laser (not shown). As FIG. 2 illustrates, the shape of the gain (the gain profile) of an EDFA changes with the gain of the EDFA. The gain profile may also be affected by temperature, age and other effects. In order to maintain each of the power levels of the individual wavelength components at substantially the same level, it is desirable to have a flat gain profile over the wavelength range of the transmitted channels. A fixed filter cannot flatten the profile of the amplifier for all gain conditions. It is therefore desirable to provide an adaptive filter for the line amplifier to provide compensation for (i.e. to flatten) the varying gain profiles.

The article "Tunable Gain Equalisation Using a Mach-Zehnder Optical Filter in Multistage Fibre amplifiers" (Reference IEEE Photonics Technology Letters, Vol. 3. No. 8, August 1991, Pg718; Kyo Inoue, Toshimi Kominato, and Hiromu Toba) indicates how a tunable signal gain equalisation may be demonstrated using a waveguide type Mach-Zehnder (MZ) optical filter, such that by adjusting the MZ transmittance with the external control current, tuneable gain equalisation may be achieved at the output of each of the amplifier stages. Further, EP794,599 discloses a gain equaliser which includes a plurality of periodic optical filters for equalising the gain of an optical amplifier. This application suggests that the wavelength, phase and amplitude (attenuation) of the transparency characteristics of the filters may be adjusted to allow the optical SNR (Signal to Noise Ratio) in the transmission system to be equalised.

Neither of the above documents discloses the control strategies appropriate for such tuneable filters.

As current system designs are approaching the limit of what it is possible to achieve with fixed filters, there is an increasing requirement for a device that will equalise the optical powers in the transmission system channels, and compensate for any non-flat losses in the system.

An ideal control algorithm must be both quick and stable. It must be robust to variations in the number of channels, and must be flexible enough to allow good control over the complete transmission system.

Various control techniques for obtaining the best fit of one or more periodic filters to such an amplification system would be apparent to a skilled person.

For instance, a figure of merit (a single value relating to how well the filters are achieving the required target spectral shape) might be defined by summing the square of the difference between the target profile and the actual profile at each wavelength. This sum of squares of the errors provides a single figure that illustrates how well the filters are fitting to the target shape, and penalises points that deviate from the target.

A brute force technique of stepping through all the possible values of the control variables, and optimising each one, could then be utilised to achieve the target amplifier profile. Equally, a simple optimisation of measuring the local gradient, and finding the minimum figure of merit would allow for a slow convergence on the optimum profile, although this might suffer by finding a false minimum of the figure of merit that provides a stable solution which is not optimum.

More sophisticated optimisations are also known, such as Golden Section searches and parabolic fits. Such optimisations can improve the speed of convergence by reducing the number of iterations required for each fit. However, such approaches will also suffer from errors due to oscillations around the desired target results.

Such oscillations may be caused by the inter-dependence of the various control axes (each axis representing the possible range of values of each control variable) on the figure of merit. Optimising one axis may well disturb several of the other axes from their optimum points.

A solution to the problem is to use a more complex figure of merit, for example to take a Fourier Transform of the error spectrum in order to measure the contributions of each of the filtering elements. Such measurements can then be utilised to modify the control parameters. The drawback of this particular method is that the Fourier Transform is not robust to gaps in error spectrum (the error spectrum being derived from the results from the individual quantised channels, with some systems only utilising some of the total possible number of channels). Also, it is not particularly tolerant of the response characteristics of real filters. However, it does allow for a number of axes to be optimised simultaneously, so that although the number of iterations does not reduce, the time for each iteration is normally reduced.

The object of the present invention is to provide a method for calculating a control signal for a filter arranged to alter the output profile of an amplifier that substantially addresses at least one of the problems of the prior art.

SUMMARY OF THE INVENTION

In one aspect, the present invention provides a method of generating at least one control signal for at least one periodic filter arranged to alter the output gain profile of an amplifier, at least one of the phase and amplitude of the filter response being tuneable, the method comprising the steps of: determining an error profile from the amplifier output gain profile and a predetermined target output gain profile; determining the convolution of the error profile and a function of similar period and form to the response of the filter; and determining at least one control signal for tuning of said filter from the calculated convolution.

Such a convolutional technique allows the amplifier control signals to be directly calculated from the convolution. Once the magnitude or value of the control signal is determined, the control signal may subsequently be generated. This technique reduces the number of iterations required for the amplifier to converge on the target gain profile. This is particularly important in systems where a rapid response is desired, but the error signal is updated relatively slowly compared with the control signal computational time. Additionally, the technique has been shown to be stable/robust to varying number of optical channels, which can result in gaps within the error spectrum and varying amplifier input power levels.

In another aspect, the present invention provides a method for generating at least one control signal for at least one periodic filter arranged to alter the output gain profile of an amplifier, at least one of the phase and amplitude of the filter response being tunable, the method comprising the steps of: determining an error profile from the amplifier output gain profile and a predetermined target output gain profile; determining the dot product of the error profile and a first function of similar period and form to the response of the filter; determining the dot product of the error profile and a second function of similar period and form to the response of the filter, the second function being substantially orthogonal to the first; and determining at least one control signal for tuning of the filter from the calculated dot products.

Utilising such a technique reduces the number of calculation steps in each iteration compared with the convolutional method. It also reduces the number of iterations and hence the number of times that an error spectrum needs to be determined compared with prior art techniques. Hence it will speed up the response time of a system utilising such a technique. In the example described in the preferred embodiment, typically only five to ten iterations of the control loop are required to achieve a best bit of the target spectrum. Results demonstrate that such a technique is both rapid and robust, and scales very well with varying numbers of optical channels.

Preferably, the target output gain profile is a flat profile over a predetermined range. Although many systems require flat amplifier gain profiles over selected ranges, it will of course be appreciated that the target profile could be of any desired shape.

Preferably, the filter has a sinusoidal response, and the first and second functions comprise sine and cosine functions in quadrature.

Preferably, a control signal relating to the amplitude of the filter response is directly determined from the magnitude of the resultant vector defined by the two dot products, and/or a control signal relating to the phase of the filter response is directly determined from the angle of the resultant vector.

Preferably, the amplifier is an optical amplifier for use in amplifying Wave Division Multiplexed signals, and the target output gain profile is a flat profile over a predetermined spectral range.

Preferably, the optical amplifier is arranged to amplify an optical signal, and the method further comprises the step of determining the amplifier output gain profile from a received pilot carrier signal frequency transmitted with the optical signal. Such a carrier signal is typically referred to as Analog Maintenance, an example of which is described in GB 2260046. In typical Analog Maintenance systems, the spectrum is regularly updated every several seconds. Clearly, the response time of an optical filter will be significantly faster than this and hence the response time of such system is limited by the speed of the Analog Maintenance. As the time period between spectrum updates is typically of the order of seconds, it allows a large amount of control processing calculations to be carried out. Hence the parameter that needs to be optimised/reduced in such a control system is the number of times that the error profile is updated.

In another aspect, the present invention provides a computer program stored on a machine-readable medium, the computer program being capable of performing a method as described above.

In further aspect, the present invention provides a method of controlling the output gain profile of an amplifier, the method comprising the steps of: determining the amplifier output gain profile; performing a method as described above; and tuning the periodic filter in accordance with the determined control signal.

Preferably, the steps are iteratively repeated.

Preferably, the optical amplifier is an Erbium Doped Fiber Amplifier, and said filter comprises at least two periodic filters, the periodic response of the second and any subsequent filters being harmonics of the response of the first filter. Such a filter set (which can form a Fourier set) minimises the number of filters required to achieve a desired level of accuracy compared with the target profile. The filters can be of Mach-Zehnder type, such as planar waveguide or split beam free space (or Fourier) filters.

The invention is also directed to an apparatus arranged to operate according to the claimed method, and including means for carrying out every function of the method.

In a further aspect, the present invention provides an apparatus for generating at least one control signal for at least one periodic filter arranged to alter the output gain profile of an amplifier, at least one of the phase and amplitude of the filter response being tuneable, the apparatus comprising: means for determining an error profile from the amplifier output gain profile and a predetermined target output gain profile; means for determining the convolution of the error profile and a function of similar period and form to the response of the filter; and means for determining at least one control signal for tuning of said filter from the calculated convolution.

In another aspect, the present invention provides an apparatus for generating at least one control signal for at least one periodic filter arranged to alter the output gain profile of an amplifier, at least one of the phase and amplitude of the filter response being tuneable, the apparatus comprising: means for determining an error profile from the amplifier output gain profile and a predetermined target output gain profile; means for determining the dot product of the error profile and a first function of similar period and form to the response of the filter; means for determining the dot product of the error profile and a second function of similar period and form to the response of the filter, the second function being orthogonal to the first; and means for determining at least one control signal for tuning of the filter from the calculated dot products.

Preferably, the amplifier is an optical amplifier arranged to amplify an optical signal, the apparatus further comprising means for determining the amplifier output gain profile from a received pilot carrier signal frequency transmitted with the optical signal.

Preferably, the apparatus further comprises the optical amplifier, and including the periodic filter.

Preferably, the optical amplifier is formed of at least one amplifying element, the filter being arranged to filter the input signal to the element, the output signal from said element or the intermediate signal between two of the elements.

In a further aspect, the present invention provides a telecommunication system comprising an apparatus as described above.

In another aspect, the present invention provides a use by an operator of a telecommunication system comprising an apparatus as described above, wherein the apparatus is being used to provide amplification to an optical signal.

The invention also provides for a system for the purposes of optimising the gain profile of an amplifier that comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 3b illustrates a phasor diagram illustrating in a vector form the results of successive iterations of the method shown in FIG. 3a;

DETAILED DESCRIPTION OF PREFERRED EMBODIMENTS

A preferred solution to the problems of the prior art is to use a convolution instead of a full Fourier Transform. This may be achieved by generating a model of the filter response (or gain profile) and then convolving the resulting attenuation spectrum with the error spectrum. In the case of the periodic sinusoidal filters, this allows the desired filter centre wavelength and attenuation (or amplitude of the sinusoidal response) to be directly calculated. This significantly reduces the convergence time compared with the Fourier Transform method. Further, since the magnitude and phase of the desired movement of the filter can be made available by this method, a standard proportional/integral control loop may be utilised.

In the best mode of the implementation of this invention, even the above mentioned reduced calculation may be simplified by the use of dot products.

Figure 1:
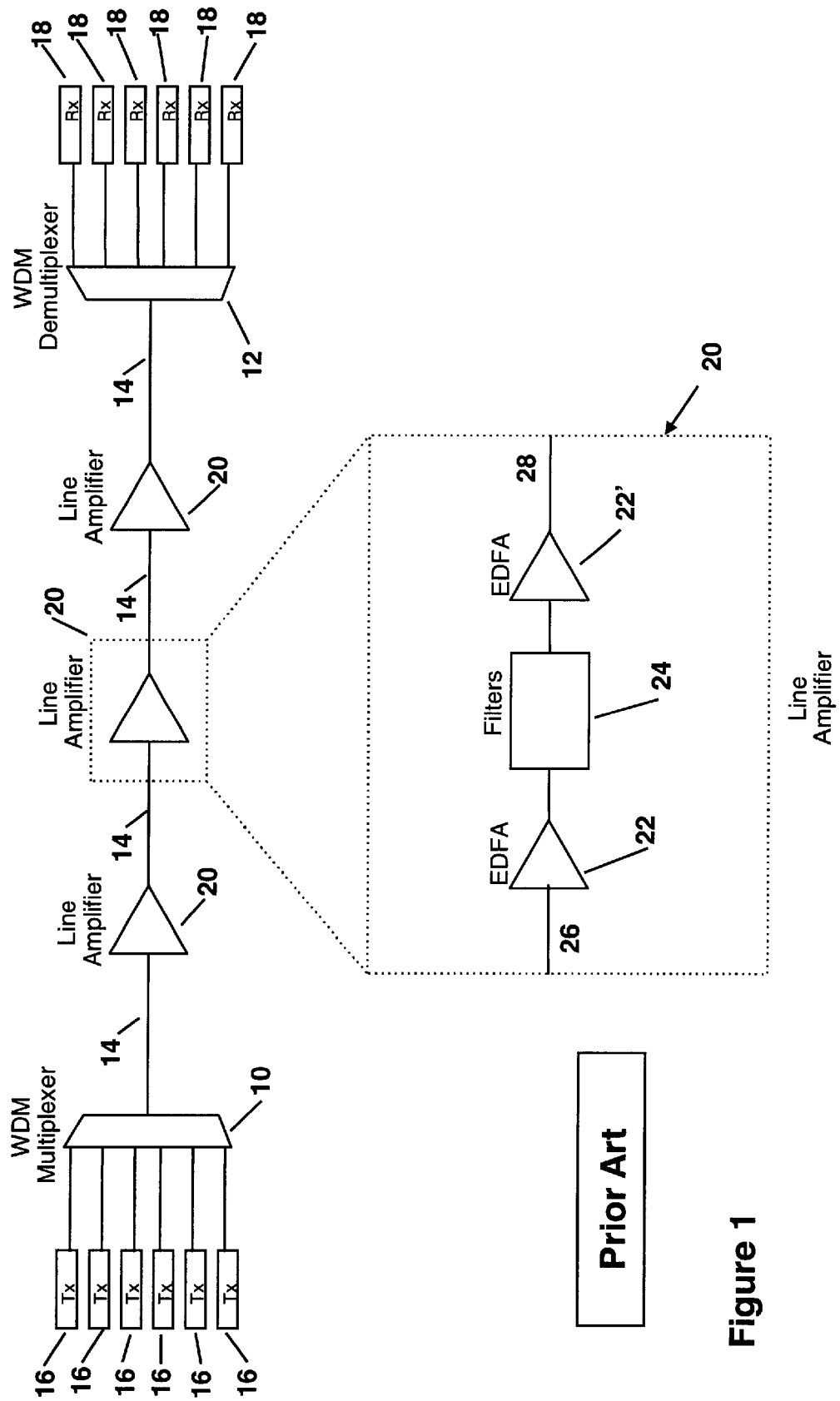
FIG. 1 illustrates a schematic diagram of a typical wavelength division multiplexed optical communications system, including a schematic diagram of a line amplifier incorporating two EDFA amplifying elements.
Figure 2:
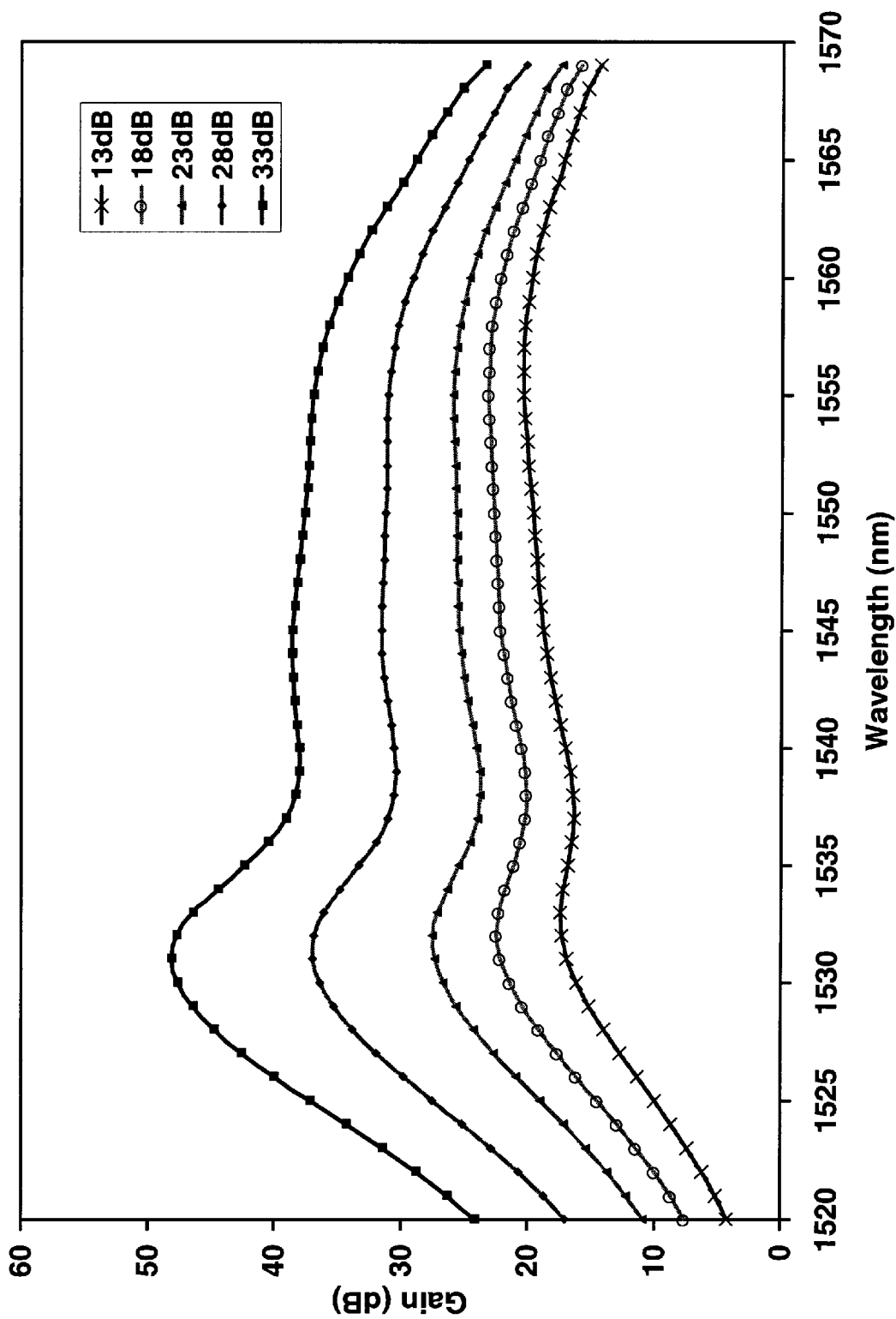
FIG. 2 illustrates the gain characteristics of the line amplifier shown in FIG. 1 when no filters are in place, for a range of different optical input powers.
Figure 6:
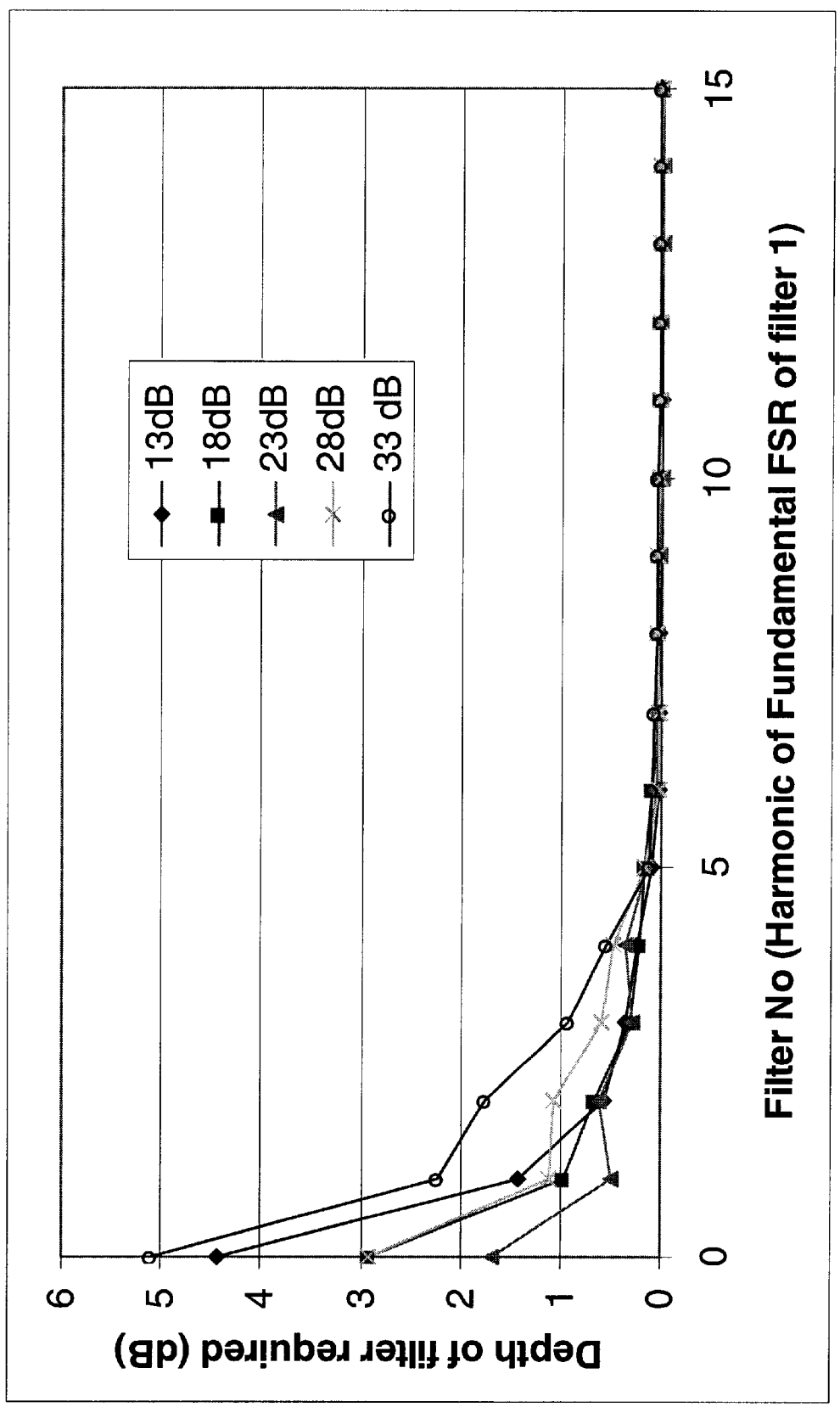
FIG. 6 illustrates the Fourier Transform of the set of gains shown in FIG. 2, indicating that most of the power is located in the lowest frequency components.

It is envisaged that the preferred control technique would be utilised in conjunction with a line amplifier comprising two EDFA amplifying elements, as indicated in FIG. 1. FIG. 6 illustrates the Fourier Transform of a set of gains taken from such an amplifier. The graph indicates that most of the power is located in the lowest frequency components. It indicates that by generating a periodic filter (e.g. a filter with a sinusoidal response) with the correct periodicity, then only a relatively limited number of filters are required to flatten such an EDFA derived amplifier over a range of gain values. In this particular instance, the graph indicates that only five sinusoidal filters are required to substantially flatten the EDFA amplifier over the operating range of interest. Consequently, in the preferred solution five tuneable sinusoidal filters replace the fixed filters 24 shown in FIG. 1.

In this preferred embodiment, the general grid spacing is assumed to be 0.8 nm and the number of grid positions 40. The filters are assumed to be numbered from 1 to 5, with respective free spectral ranges of 48, 24, 16, 12 and 9.6 nm. The free spectral range of the first filter (FSR1) has been chosen to correspond approximately to the range of the amplifier gain profile which requires flattening, with subsequent amplifier FSRs being harmonics of the first, such that the amplifiers represent a Fourier series.

The array of channels, N, contains m individual channels. Each channel, n, is transmitted at a different wavelength, $\lambda_n$, and power, $P_n$. These channels are all transmitted within a range of wavelengths which exist in the optically transparent window, f, of the optical fibre.

The first filter, 1, can be modelled with the orthogonal equations:

$$\text{Sine1} = \frac{\sin\left(2 \cdot \pi \cdot \frac{f}{FSR1}\right)}{\sqrt{0.125}} \qquad \text{equation 1a}$$

$$\text{Cosine1} = \frac{\cos\left(2 \cdot \pi \cdot \frac{f}{FSR1}\right)}{\sqrt{0.125}} \qquad \text{equation 1b}$$

where f is the range of optical frequencies in the window of interest (i.e. the range of the target profile), and FSR is the free spectral range of the filter. These equations can be repeated for filters 2 to 5, to give Sin e2 . . . Sin e5 and Cosin e2 . . . Cosin e5.

(Both of the above equations have been divided by the square root of 0.125 in order to make the RMS (root means square) of the stored waveforms equal to 2.)

T is an array of the target spectral points representing the target gain profile, i.e. $T_n$ is the target power for channel n. In the preferred embodiment, this is a flat gain profile i.e.

$$T_n = -10 \text{ dBm} \qquad \text{equation 2}$$

S is the actual measured spectrum, so $S_n$ is the optical power (in dBm) in channel n. It may be measured by using a system management tool such as Analog Maintenance, or by using a spectrum analyser.

The error spectrum can then be defined as E1:

$$E1 = S - T \qquad \text{equation 3}$$

This can then be converted into linear units and centred around zero:

$$E = 10^{\frac{El}{10}} - 1 \qquad \text{equation 4}$$

This linear error spectrum can be used to calculate the sine and cosine dot products for each filter.

$$Dot\text{Sine}1 = \frac{\sum_n \text{Sine} I_n \cdot E_n}{m} \qquad \text{equation 5a}$$

$$Dot\text{Cosine}1 = \frac{\sum_n \text{Cosine} I_n \cdot E_n}{m} \qquad \text{equation 5b}$$

The steps of equations 5a and 5b would then be repeated for filters 2 to 5, providing Dot Sin e2 . . . Dot Sin e5 and Dot Cosin e2 . . . Dot Cosin e5.

This set of dot products can be used as the error signal in a feedback control loop. They can be added to the results from the previous iteration (k) of the control loop:

LoopDot Sin $e1k+1$=Dot Sin $e1$+LoopDot Sin $e1k$ equation 6a

LoopDot Cosin $e1k+1$=Dot Cosin $e1$+
 LoopDot Cosin $e1k$ equation 6a

Again the above steps 6a and 8b would be repeated for the remaining filters.

The sine and cosine dot products can be converted to a magnitude (M) and phase φ representation:

$$M = \sqrt{LoopDot\text{Sine}^2 + LoopDot\text{Cosine}^2} \qquad \text{equation 7}$$

$$\phi = \tan^{-1} LoopDot\text{Sin} \frac{e}{LoopDot\text{Cosine}} \qquad \text{equation 8}$$

The magnitude and phase representation is calculated in order to move the filters to their new positions. The M value is used to drive the depth of each of the filters (i.e. it represents the amplitude of the periodic filter response), and the φ value is used to drive the centre wavelength of the filters (i.e. it represents the phase of the periodic filter response).

Hence by generating the result of each filter in two positions of centre wavelength, chosen so that the phase is in quadrature, only two calculations are necessary. These calculations can be converted directly into magnitude and phase of the frequency content of the error signal of the filter in question. Consequently, only ten dot products are necessary to calculate the decide movements of all five filters. This method is hence both quicker and more robust than the Fourier technique of the prior art, and scales well with varying numbers of channels.

Figure 3A:
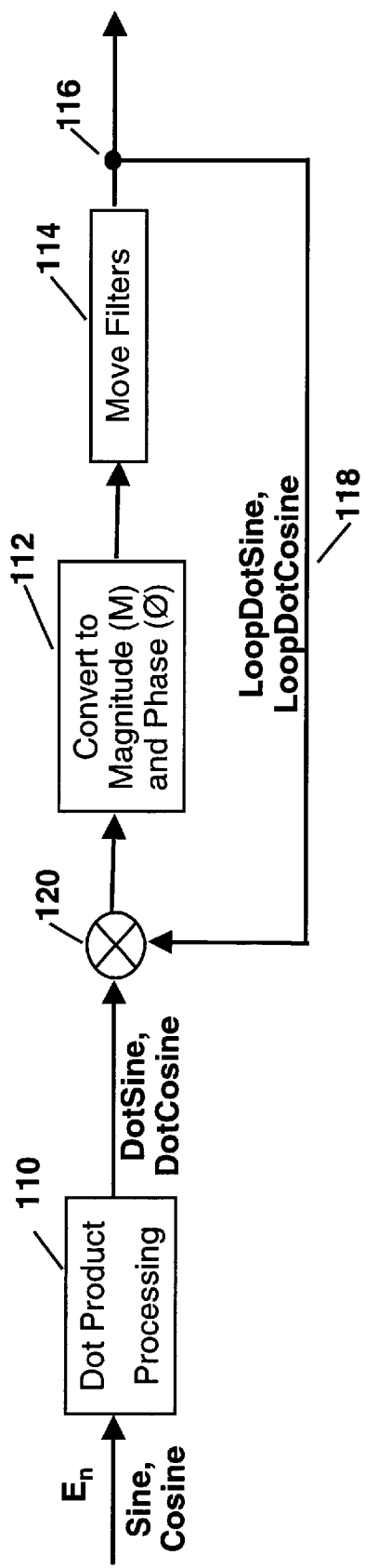
FIG. 3a illustrates a flow chart of the operations required to select the appropriate filter configuration for an amplifier, in accordance with a preferred embodiment of the present invention.
Figure 3B:
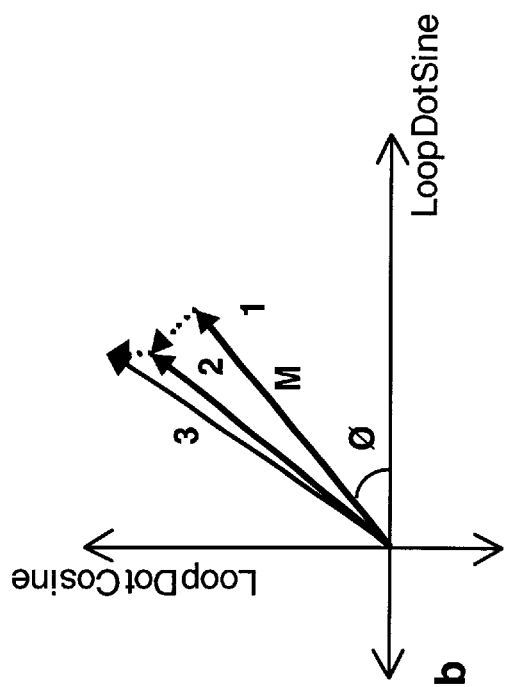

FIG. 3a illustrates the flowchart of a control process illustrating the above embodiment, with FIG. 3b demonstrating vectorially how the phase φ and magnitude (M) of the vector defined by the dot products would appear for the first iteration step 1. It also shows how successively iteration steps 2,3 would gradually approach the ideal solution (Dotted lines show the results of each feedback loop iteration; solid lines indicate the resulting values of M and φ).

In normal operation, the iteration loops dot 120, would be at the point where the actual spectrum ($S_p$) would be measured, and the error signal consequently generated. Successive measurements of the spectrum would obviously be taken once the filters had been moved (step 114) i.e. at point 116. If required, a gain constant K could be utilised to "weight" the magnitude of the feedback components.

Practical experience has shown that the error in fitting the spectrum to the desired profile is mainly due to the DC offset level of the filters. In order to correct this, a few software iterations equalising an internal software model of the filters may be performed before the actual magnitude and phase values calculated are used to move the filters (i.e. step 114 may not initially be included within the control loop).

Figure 4:
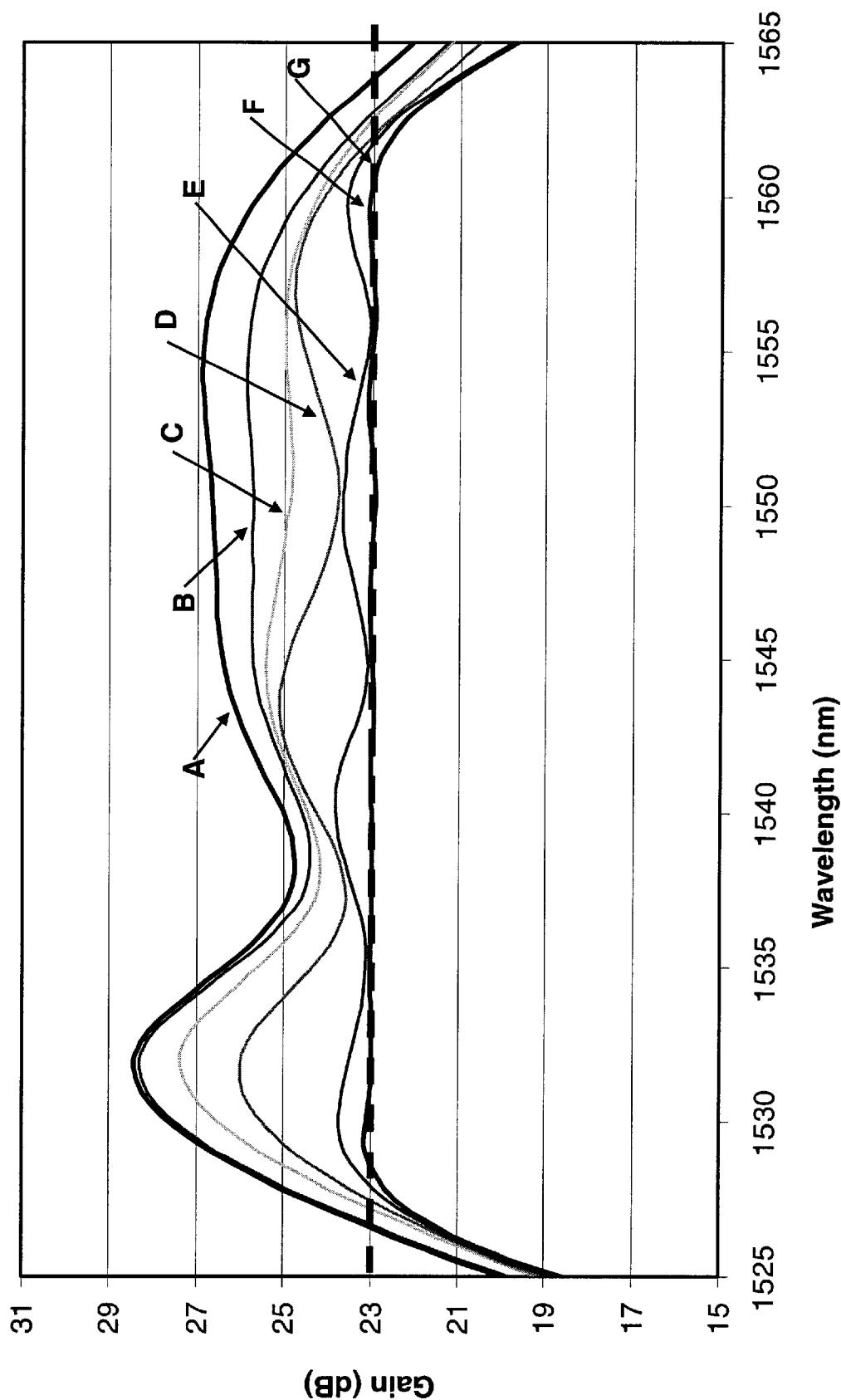
FIG. 4 shows a gain profile of an EDFA amplifier, the target gain profile and the resulting gain profile as successive sinusoidal filters are utilised.

FIG. 4 shows the initial amplifier gain profile (A), the target gain profile (illustrated by dotted line G) and the results as the amplifier spectrum is affected by the optimised values of the five filters (B to F) this illustrates how well the method operates at a pre-set gain of 23 dB.

Figure 5:
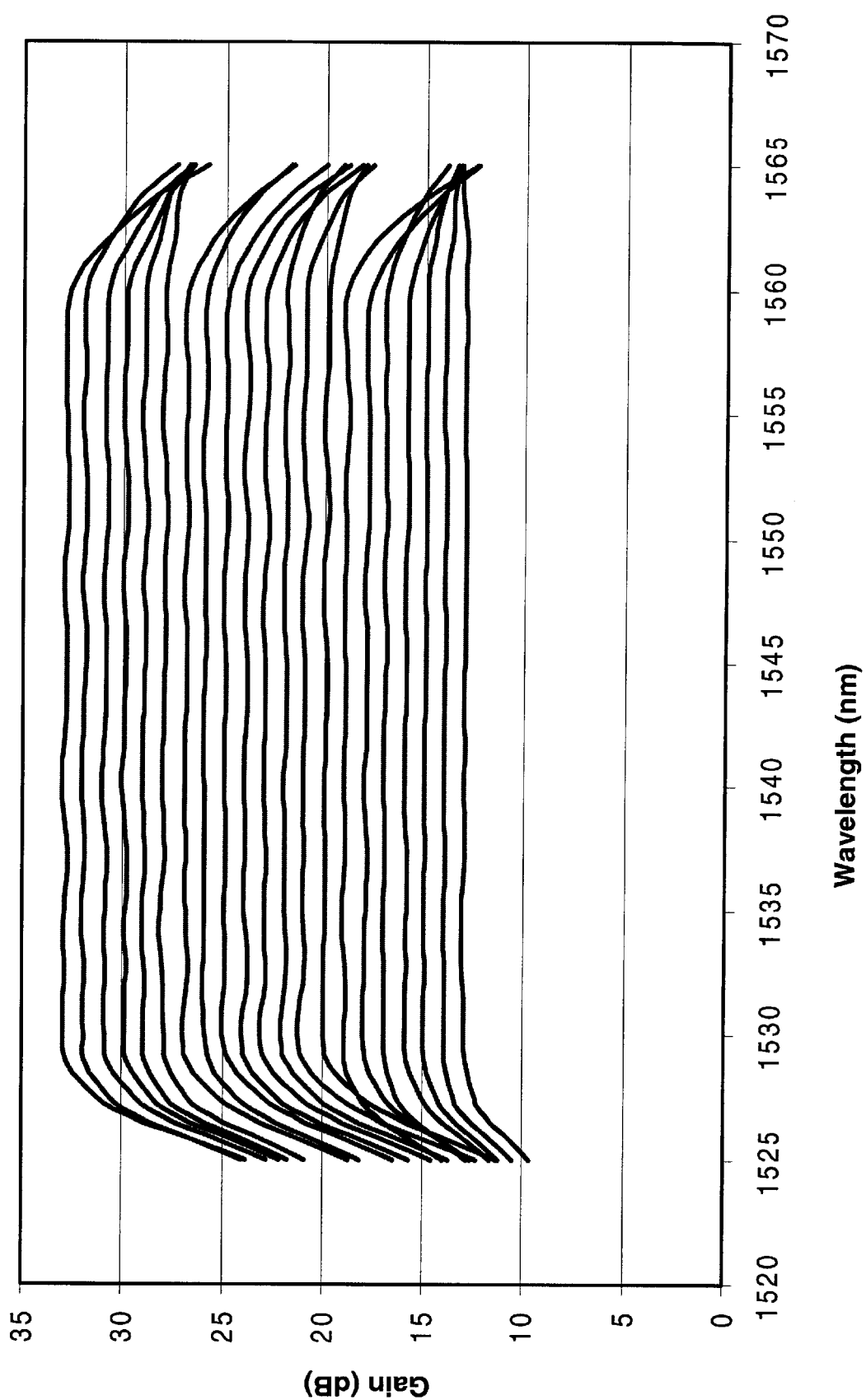
FIG. 5 illustrates a range of resultant gain profiles corresponding to different flat target gain profiles for an EDFA line amplifier system incorporating five tuneable sinusoidal filters.

FIG. 5 illustrates the resultant gain profiles obtained utilising an EDFA amplifier and five sinusoidal filters for a set of different target gain profiles, and demonstrates how flat spectrums may be achieved at a desired range of target profiles.

For the purposes of this specification, the terms 'optical' and 'light' should be understood as pertaining not only to the visible part of the electromagnetic spectrum, but also to the infra-red and ultra-violet parts that bound the visible part.

Any range or device value given herein may be extended or altered without losing the effect sought, as will be apparent to the skilled person from an understanding of the teachings herein. For instance, whilst the preferred embodiment of the present invention has been described in conjunction with a specific type of optical amplifier, it will of course be appreciated that the invention may equally be applied to the optimisation of any other type of amplifier.

What is claimed is:

1. A method of generating at least one control signal for at least one periodic filter arranged to alter the output gain profile of an amplifier, at least one of the phase and amplitude of the filter response being tuneable, the method comprising the steps of:

determining an error profile from the amplifier output gain profile and a predetermined target output gain profile;

determining the dot product of the error profile and a first function of similar period and form to the response of the filter;

determining the dot product of the error profile and a second function of similar period and form to the response of the filter, said second function being substantially orthogonal to said first; and determining at least one control signal for tuning of said filter from the calculated dot products.

2. A method as claimed in claim 1, wherein said target output gain profile is a flat profile over a predetermined range.

3. A method as claimed in claim 1, wherein said filter has a sinusoidal response, and said first and second functions comprise sine and cosine functions in quadrature.

4. A method as claimed in claim 3, wherein a control signal relating to the amplitude of the filter response is directly determined from the magnitude of the resultant vector defined by the two dot products, or a control signal relating to the phase of the filter response is directly determined from the angle of said resultant vector.

5. A method as claimed in claim 1, wherein said amplifier is an optical amplifier for use in amplifying Wave Division Multiplexed signals, and said target output gain profile is a flat profile over a predetermined spectral range.

6. A method as claimed in claim 5, wherein said optical amplifier is arranged to amplify an optical signal, and said method further comprises the step of determining the amplifier output gain profile from a received pilot carrier signal frequency transmitted with said optical signal.

7. A computer program stored on a machine-readable medium, said computer program being capable of performing a method as claimed in claim 1.

8. A method of controlling the output gain profile of an amplifier, said amplifier comprising at least one periodic filter arranged to alter the output gain profile of the amplifier, the method comprising the steps of:

determining the amplifier output gain profile;

performing a method as claimed in claim 1; and tuning the periodic filter in accordance with said determined control signal.

9. A method as claimed in claim 8, wherein the steps are iteratively repeated.

10. A method as claimed in claim 8, wherein said optical amplifier is an Erbium Doped Fiber Amplifier, and said filter comprises at least two periodic filters, the periodic response of the second and any subsequent filters being harmonics of the response of the first filter.

11. A method as claimed in claim 10, wherein said filters are of Mach-Zehnder type, such as planar waveguide or split beam free space filters.

12. A method of generating at least one control signal for at least one periodic filter arranged to alter the output gain profile of an amplifier, at least one of the phase and amplitude of the filter response being tuneable, the method comprising the steps of:

determining an error profile from the amplifier output gain profile and a predetermined target output gain profile;

determining the convolution of the error profile and a function of similar period and form to the response of the filter; and determining at least one control signal for tuning of said filter from the calculated convolution.

13. An apparatus for generating at least one control signal for at least one periodic filter arranged to alter the output gain profile of an amplifier, at least one of the phase and amplitude of the filter response being tuneable, the apparatus comprising:

means for determining an error profile from the amplifier output gain profile and a predetermined target output gain profile;

means for determining the convolution of the error profile and a function of similar period and form to the response of the filter; and means for determining at least one control signal for tuning of said filter from the calculated convolution.

14. An apparatus for generating at least one control signal for at least one periodic filter arranged to alter the output gain profile of an amplifier, at least one of the phase and amplitude of the filter response being tuneable, the apparatus comprising:

means for determining an error profile from the amplifier output gain profile and a predetermined target output gain profile;

means for determining the dot product of the error profile and a first function of similar period and form to the response of the filter;

means for determining the dot product of the error profile and a second function of similar period and form to the response of the filter, said second function being orthogonal to said first; and means for determining at least one control signal for tuning of said filter from the calculated dot products.

15. An apparatus as claimed in claim 14, wherein said amplifier is an optical amplifier arranged to amplify an optical signal, the apparatus further comprising means for determining the amplifier output gain profile from a received pilot carrier signal frequency transmitted with said optical signal.

16. An apparatus as claimed in claim 14, further comprising the optical amplifier, and including said periodic filter.

17. An apparatus as claimed in claim 16, wherein said optical amplifier is formed of at least one amplifying element, said filter being arranged to filter the input signal to said element, the output signal from said element or the intermediate signal between two of said elements.

18. A telecommunication system comprising an apparatus as claimed in claim 13 or claim 14.

19. A use by an operator of a telecommunication system as claimed in claim 18, wherein said apparatus is being used to provide amplification to an optical signal.

* * * * *